and a pre-
United States Patent [19]

Gebhardt-Seele

[11] 3,751,831
[45] Aug. 14, 1973

[54] APPARATUS FOR EVALUATING PUPILS REPLIES

[76] Inventor: Peter Gebhardt-Seele, Wettersteinstrasse 3, 8023 Grosshesselohe bei Munich, Germany

[22] Filed: Mar. 10, 1971

[21] Appl. No.: 122,943

[52] U.S. Cl. .............................................. 35/48 B
[51] Int. Cl. ............................................ G09b 7/00
[58] Field of Search ................. 35/48 R, 48 B, 9 R, 35/9.2, 8 R

[56] References Cited
UNITED STATES PATENTS

| | | | |
|---|---|---|---|
| 3,399,469 | 9/1968 | Nisbet | 35/48 R |
| 1,650,247 | 11/1927 | Turck | 35/9 R |
| 2,738,595 | 3/1956 | John et al. | 35/48 R |
| 3,190,014 | 6/1965 | Rhodes | 35/48 R |
| 3,497,968 | 3/1970 | Ferris | 35/48 R |
| 3,594,927 | 7/1971 | Koizumi | 35/48 R |

*Primary Examiner*—Robert W. Michell
*Assistant Examiner*—J. H. Wolff
*Attorney*—George F. Dvorak and Marden S. Gordon

[57] ABSTRACT

Apparatus for grading answers of students, having a plurality of student answering stations each connected to a central recording apparatus having marking means therein controlled by one or more switches of the student station; and a recording medium in the central recording apparatus arranged to pass by each marking means for having a marking placed thereon; and a preselecting means in the central recording apparatus which is responsive to the answering station marking means for evaluating the reply on the recording medium.

13 Claims, 6 Drawing Figures

APPARATUS FOR EVALUATING PUPILS REPLIES

The present invention relates to apparatus for evaluating pupils' replies, and in particular to apparatus which includes a number of pupils' places, and a central recording apparatus including preselecting means cooperating with at least one reply switch at each pupil's place to evaluate the signal caused by the operation of the reply switch as a correct or incorrect reply, and means for recording at least every correct reply in the form of a mark on a recording medium which is advanced by a step after each question.

In known apparatus of this kind, the central recording apparatus comprises an electric typewriter which is controlled by an electronic computer and is adapted to record the replies of the individual pupils on the recording medium by defined selection of its types, after each question and adjacently in one line and in timed sequence. The electronic computer must therefore be capable of first storing the replies to each question given by the individual pupils and then of transmitting the required pulses in a predefined sequence and successively to the typewriter so that all replies given by each individual pupil during a lesson may be recorded one below the other in a defined column. This known apparatus is capable of providing neatly grouped documents containing information, and it is also possible, by using the typewriter, to enter the names of the associated pupils with characters disposed one below the other, into the individual document columns associated with each pupil. However, owing to its complicated components, the known apparatus is so expensive that it cannot be introduced in the foreseeable future to most schools.

It is therefore an object of the invention to provide apparatus for evaluating pupils' replies in which a document with sufficient information regarding the performance of the individual pupils can be obtained by substantially more simple means, and which provides approximate data of the performance average of the entire pupil group.

According to the present invention the recording apparatus includes at least one separate marker for each pupil's place spaced from the corresponding markers of other pupils' places in a direction transverse to the direction of motion of the recording medium. Owing to the fact that each individual pupil's place is provided with its own marker for recording the correct replies, or with markers for recording correct and incorrect replies, it is possible for the individual markers to be operated in any desired sequence or simultaneously by means of the pulses triggered at the individual pupils' places.

Accordingly, it is not necessary to provide apparatus for storing and sorting the pulses, nor is it necessary for motion, such as the conventional motion in typewriters along the individual lines, to take place between the recording medium and the marker, a feature resulting in a substantial simplification; if based on a group of pupils of a conventional number, the total number of markers required to this end is no greater in the apparatus according to the invention than in a conventional typewriter.

In a preferred embodiment, the recording apparatus for each pupil's place incorporates two markers, one for correct replies and one for incorrect replies. The markers associated with each pupil's place may be distinguished in that they produce different symbols, for example one with a cross and the other with a zero if the symbols are to be produced in clear characters. The two markers for each pupil's place may be spaced apart transversely to the direction of motion of the recording medium as well as by a half step along the said direction of motion, their action on the recording medium being confined to half a step length. In this way it is possible for a line document to be produced with particularly simple marking means, for example constructed in the form of styli, in which each line associated with a single question is subdivided into two halves of which, for exmaple, the upper half contains only the correct replies and the lower half, distinctly separated by the lateral offset of the sets of markers, contains only the incorrect replies. The result of the reply to each individual question given by the totality of the pupils and the overall performance of each individual pupil can thus be easily evaluated.

If the recording medium is constructed of heat-sensitive material, the markers may take the form of thermal recorders which bear constantly on the recording medium and which are electrically heated in each case to produce a line on the continuously advancing recording medium.

The markers may be mounted to move substantially at right angles to the recording medium and may be actuated by a rocking magnet armature having a central position in which both markers are spaced from the recording medium, whence it can be rocked to either of two limiting positions, to engage either marker with the recording medium, by a reply magnet controlled by a reply switch at the associated pupils' place. The armature of each reply magnet may be supported on one end of a rod-shaped magnet core having a winding in which the current direction depends on the operation of the reply switch and determines whether the armature will be a north pole or a south pole, all the reply magnets cooperating with a common field electro magnet the poles of which extend parallel to the axes of tilting of the armatures which are in line. Such a system enables the current direction in the winding of the individual reply magnets, and depending on the operation of the reply switches, to be utilized as data media and to be evaluated without the interconnection of a diode. To this end it is sufficient for a single reply magnet to be associated with each pupil's place.

In a further embodiment of this apparatus, with only two reply switches for each pupil's place, the current direction in the winding of the field electro magnet may be preselected by a switch, which is actuated by the teacher or which is programme-controlled.

If it is desirable, at the end of a lecture, for an indication to be obtained for each pupil to summarize his performance, it is possible for the apparatus according to the invention to be further constructed so that each pair of associated markers is associated with a ratchet to count the difference between the numbers of correct and incorrect replies, and each marker has one feed pawl held retracted from the ratchet when the associated armature is in the middle position, and arranged for each operation of the associated marker to engage the ratchet and to advance it, in a forward direction for correct reply, and in a rearward direction for an incorrect reply. The difference between the number of correct replies and the number of incorrect replies obtained at the end of a lecture by the position of the ratchet for each pupil will be itself provide a better impression of the performance of the pupil than the sum of correct replies which, in the case of a pupil giving only correct replies but giving no replies to a part of the questions, may be as large as in the case of a pupil whose recording document contains chance correct replies in addition to incorrect replies.

In order to prevent a large number of incorrect replies and the resultant rearward rotation of the ratchet resulting in the same counter-position at the end of a lecture as would be obtained by a large number of correct replies, it is possible for the number of questions to be confined to half the number teeth of each ratchet. However, experience has shown that considerably more than half the replies are correctly given so that there will be only exceptional cases in which at the end of a lecture the ratchet for one pupil will have rotated entirely in the reverse direction from the starting position. In order to be able to pose the largest possible number of questions without involving the danger of a doubtful counter-position, the ratchet may be provided with a stop to prevent it from being rotated in the rearward direction beyond a defined position.

It is advantageous if at least each marker for incorrect replies is connected to its feed pawl through a spring which permits operation of the marker even when the stop is operative. In this event it is possible for the document to be completely continued even for pupils whose differential counter has been rendered ineffective by an excessively large number of incorrect replies. It may be desirable for summarizing data of the number of replies, correct or incorrect, given by each pupil to be obtained in addition to the documentation obtained for each individual reply. This is possible if, in accordance with a further feature of the invention, each pair of markers is provided with additional feed pawls, both of which actuate a common ratchet to advance it in the same direction, to act as a counter for the total number of replies, both correct and incorrect.

Each of the ratchets, functioning as sum or difference counters, may be provided with a number wheel, having raised numbers on its circumference, and the recording medium may be interposed between the number wheels and a printing strip arranged to thrust it against the number wheels. This construction makes it possible for the final result of all number wheels to be printed or embossed on to the recording medium at the end of a lesson. It may be desirable for the feed pawls provided on the markers for correct replies to be adapted to advance, when actuated, the associated ratchets by an angle which may be greater or smaller than the angle through which the feed pawls on the markers for incorrect replies reverse the ratchets functioning as sum and difference counters, whenever the system is actuated. Such a differential evaluation of correct and incorrect replies is justified if each pupil's place is provided with more than two reply switches of which only one supplies a signal on being operated where such signal is regarded as the correct reply while actuation of each other reply switch provides an incorrect reply so that the probability for correct and incorrect replies is irregularly distributed. It is therefore advantageous in accordance with a further feature of the invention to provide all the feed pawls operating a counter in the same direction, with a common deflector which is arranged to retract them and is adjustable so that the feed pawls optionally advance the counter by one or more teeth for each actuation.

The electrical connections between the reply switches and the reply magnets are so constructed that the pupils cannot correct a reply, once given, by subsequent depressing of another switch after they have recognized, by the document, an illuminated indication or by observation of another pupil, that the reply first given was incorrect.

In a preferred form of the apparatus according to the invention, each pair of markers is provided with switches which, when both markers are in the inoperative state, are connected in series with each other and with the winding of the associated reply magnet and the associated reply switches and, in the operative state of the associated marker, applies the winding of the reply magnet to a voltage, maintaining the position of the armature of the reply magnet while by-passing the switch provided on the second marker and the reply switches and through a switch which opens only after the recording medium has been advanced by one step.

If each of the pupil's places is provided with two reply switches, they may be so connected that each is adapted, in its operative position, to close an alternating current circuit containing the associated reply magnet through a rectifier, the respective reply switches connecting the rectifier in opposite directions in relation to the reply magnet.

The alternating current circuit, which may contain a signal lamp, is closed in the inoperative state of the two reply switches while the rectifier is by-passed, and one of the markers is arranged, when actuated, to isolate the lamp circuit from the winding of the associated reply magnet and connect it via a. capacitor or resistor to a higher alternating voltage, the resistance of the lamp circuit being such that the lamp will only be illuminated in the latter condition.

In a further embodiment of the present invention two or more reply switches of each pupil's place may be connected each through one d.c. conductor, common to all corresponding reply switches of all pupil's places, to a preselector switch adapted to define the current direction, and, when actuated, connect the appropriate common conductor through switches provided on both the associated markers to the winding of the associated reply magnet. In this embodiment it is possible for the preselector switches to be actuated manually by the teacher or by a programme and the field magnet, cooperating with all reply magnets, may be a d.c. magnet of unvarying polarity whose winding is rendered dead for a short period at the end of a period of time defined for giving the reply to a question so that the rocker-shaped armatures of the reply magnets are able to drop out.

In the last described embodiment, the connection between the reply switches of each pupil's place and the winding of the associated reply magnet may contain a signal lamp in parallel with a rectifier.

It is advantageous if the teacher giving the lesson is able to determine at a glance, at least approximately, the number or percentage of pupils having given a correct reply to a question. To this end, there may be provided an electrical measuring instrument having a pointer with a marking member the position of which depends on the number of correct replies given to each question, and which is interposed between the recording medium and an additional member adapted for actuation after each question to thrust the said marking member against the recording medium transversely to the pivoting plane of the pointer. This construction and arrangement of the measuring instrument offers the advantage of recording the indication of the measuring apparatus on the document for subsequent consideration and for subsequent monitoring in audio-visual instruction without teachers.

The essential content of the document may be made particularly distinctive if, in accordance with a further feature of the invention, a pulse transmitter, such as a transport relay cooperating with a control relay, each pulse of which actuates the marking apparatus in the same way as an incorrect reply, is adapted to be connected to the windings of the field magnet and the reply magnets so that all differential counters are reversed in steps while the recording medium is advanced, until the associated stop operates to stop the ratchet of each differential counter, and the associated marking apparatus is thus stopped.

To stop the marker it is possible for a purely mechanical interlock to be provided, the said interlock being so constructed that each marker for incorrect replies is retained by its feed pawl to prevent motion towards the recording medium as soon as the associated differential counter is prevented by the associated stop from continuing its reverse rotation.

However, as already mentioned, it is advantageous if the markers for incorrect replies are connected to the associated feed pawl by one tension spring each which permits operation of the associated markers even when the stop is engaged.

In this case there will be no purely mechanical interlock which, in the event of reverse rotation of the differential counter, would prevent further actuation by the pulse transmitter of those markers whose counters have reached the ratchet position. The function of interlocking in this case is appropriately provided by a system in which each stop is associated with a switch which isolates the pulse transmitter from the associated reply magnet when the stop is engaged.

The invention may be put into practice in various ways but one specific embodiment and a modification will now be described by way of example with reference to the accompanying diagrammatic drawings, in which.

Figure 1:
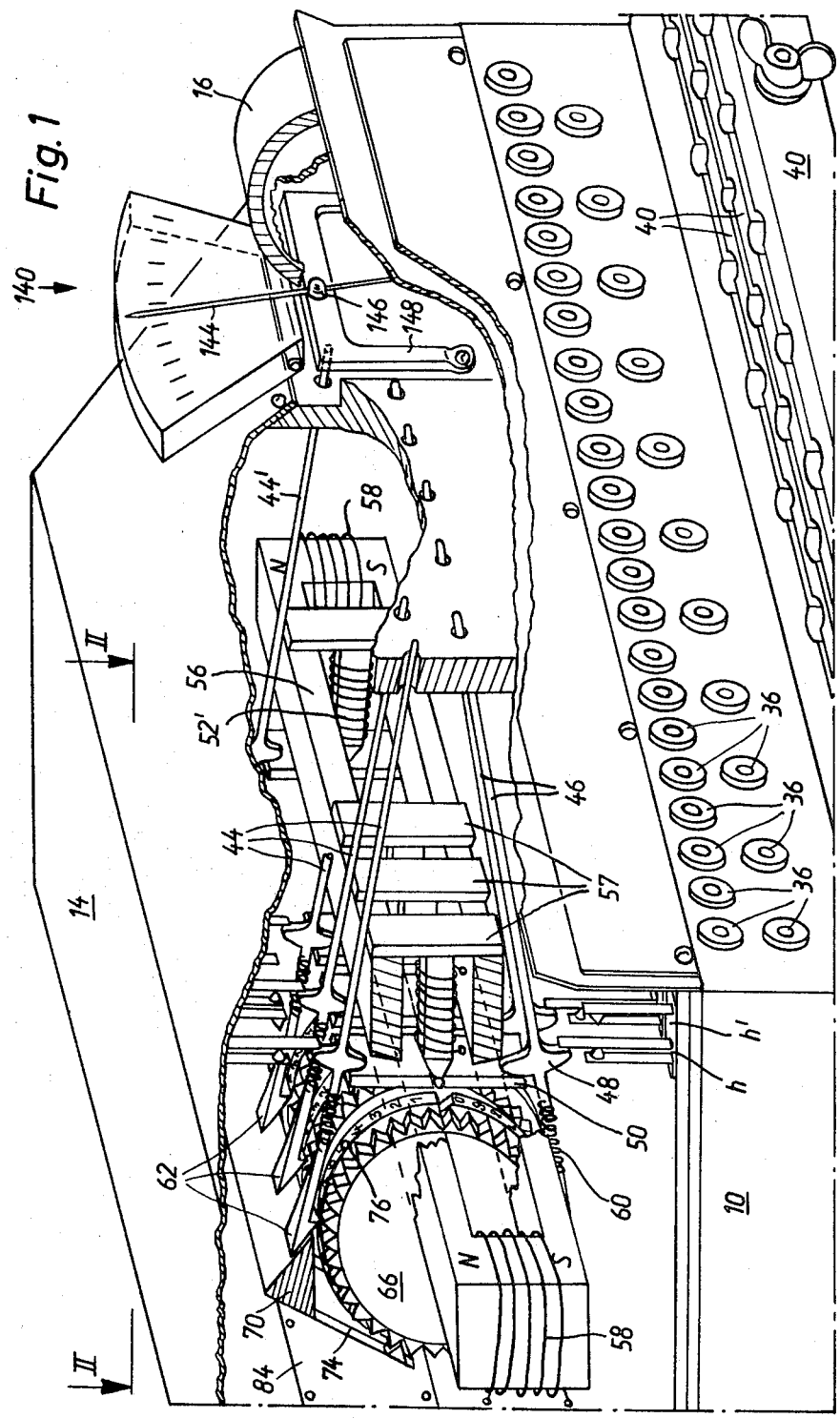
FIG. 1 is a perspective view, partly broken away of a central recording apparatus for evaluating pupils' replies.
Figure 2:
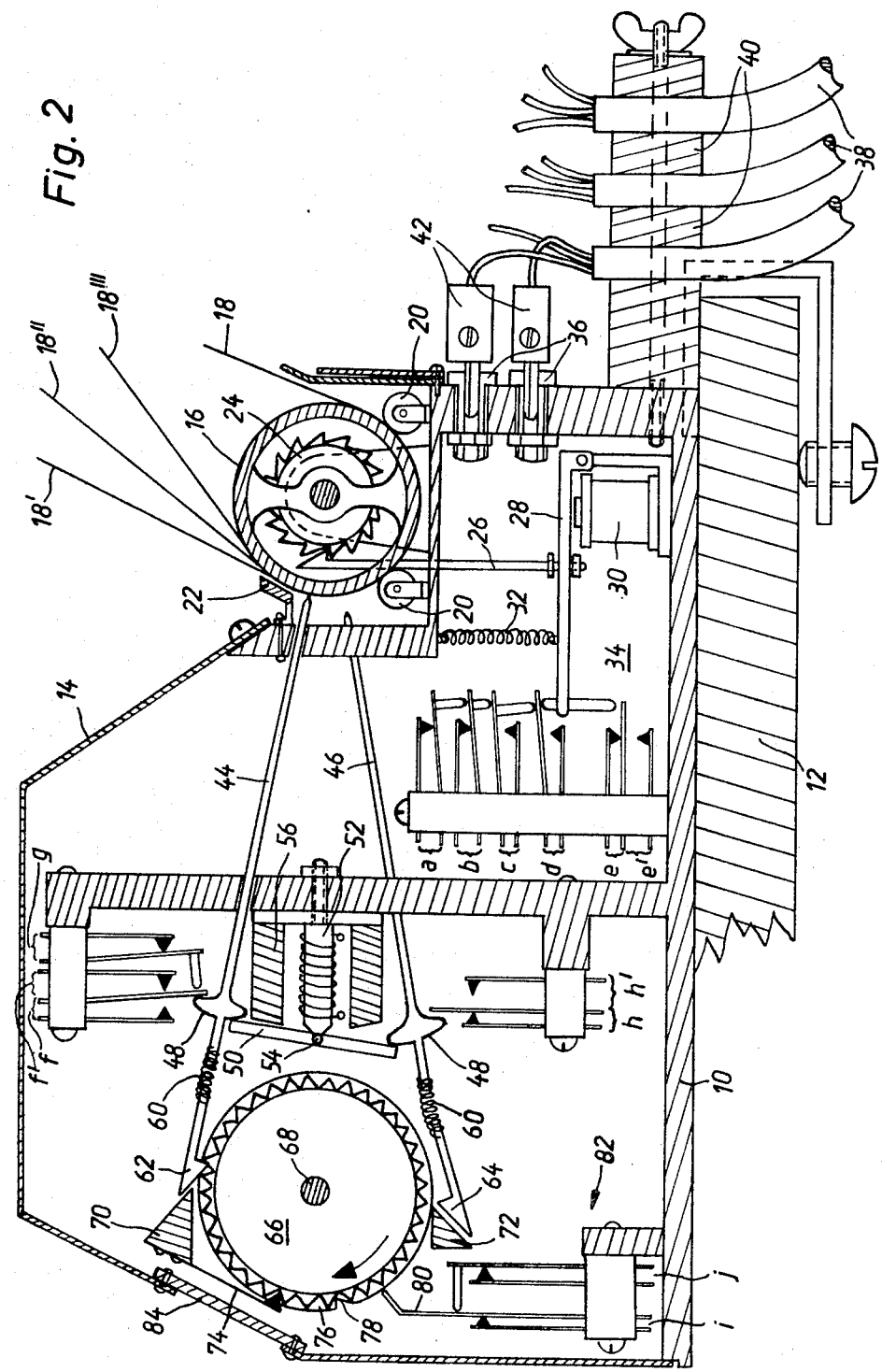
FIG. 2 is a section along the plane II—II of FIG. 1.

The central recording apparatus illustrated in FIGS. 1 to 4 comprises a housing 10, which can be clamped on to a table surface 12 as indicated in FIG. 2 and is covered by means of a removable housing lid 14. A roller platen 16 of the kind conventionally used in typewriters is supported in a recess of the housing 10, the recess being open at the top; a paper web 18 passes over the roller platen. The paper web 18 functions as a recording medium and, according to FIG. 2, comprises a transparent outer layer 18, a double-sided carbon paper 18' middle layer and a normal paper 18'' inner layer which bears directly upon the roller platen 16. The recording medium is retained by pressure rollers 20 to bear on the roller platen 16 and can be torn off against a sharp-edged strip 22. A ratchet 24, into which a feed pawl 26 engages, is mounted on the roller platen 16. The feed pawl 26 is mounted on a pivotally supported armature 28 of an electro-magnet 30 which will be referred to hereinbelow as feed magnet. According to FIG. 2, the armature 28 is biased upwards by a tension spring 32 against the pull exerted by the feed magnet 30. The armature 28, the feed magnet 30 and the spring 32 are components of a feed relay, reference in its entirety by the numeral 34 and comprising six switches $a$ to $e'$ which are actuated by the armature 28.

The housing 10 of the recording apparatus is provided with electrical terminal sockets 36 for a number of pupils' places; FIG. 1 shows three terminal sockets each for a total of eleven pupil places. The number of terminals required for each pupil place will however depend on the circuits of the pupils' places (which are identical with one another) and of the recording apparatus, shown in two alternatives in FIG. 5 and 5a respectively. The conductors extending from the recording apparatus to the individual pupils' places are combined into cables 38, the ends of which are retained in an arrangement corresponding to the location of the pupils' places, namely between terminal strips 40 which are detachably mounted on the housing 10.

The recording apparatus is provided for each pupil's place with two markers in the form of recording styli 44 and 46, of which the stylus 44 records correct replies and the stylus 46 records incorrect replies on the recording medium 18. All recording styli 44, 46 are guided in the housing 10 so as to slide radially in relation to the roller platen 16. Each pair of recording styli 44, 46, associated with one pupil's place, is associated with a rocking armature 50 adapted to act on a shoulder 48 formed on each of the recording styli. Each armature 50 is pivoted to rock about a transverse axis through its center at the end of the rod-shaped core of a reply magnet 52; the axes 54 of all armatures 50 are in alignment with each other, and extend parallel to the axis of rotation of the roller platen 16 in the middle plane between the two planes of which one contains all recording styli 44 for correct replies and the other all recording styli 46 for incorrect replies.

Each recording stylus 44 for correct replies forms part of a relay comprising three switches $f$, $f'$ and $g$, cooperating with the shoulder 48 of the appropriate recording stylus, of which the switches $f$ and $f'$ have a middle spring contact in common while the switch $g$ comprises two separate spring contacts. Each recording stylus 46 for incorrect replies also forms part of a relay comprising two switches $h$ and $h'$ adapted to cooperate with the shoulder 48 of the appropriate recording stylus and having a common middle spring contact. The spring contacts of these switches tend to withdraw the recording stylus from the roller platen 16 and to retain the associated armature 50 in its middle position.

All the reply magnets 52, each of which, with its armature 50, is associated with one particular pupil's place, are surrounded by a rectangular yoke 56, forming the core of a field magnet which is common to all the pupils' places and which is connected to the core of each reply magnet by means of a magnetically conductive shunt plate 57. The two short members of the yoke 56 are provided with windings 58 which may be connected to a d.c. source so that of the two long members or pole pieces of the yoke 56, extending parallel to the bearing axes 54 of the armatures 50, one is a north pole and the other a south pole.

Each recording stylus 44, 46 is connected through an extensible and flexible spring 60 to a feed pawl 62 or 64 respectively. A ratchet 66, having a symmetrical tooth profile, is associated with each pair of recording styli 44, 46 and therefore with each pupil's place. All the ratchets 66 are journalled so as to be freely rotatable on a common shaft 68 extending in the common plane of the axis of rotation of the roller platen 16 and the bearing axes 54 of the armatures 50, and parallel to those axes. The feed pawls 62 and 64 of the recording styli 44, 46 tend to rotate the associated ratchet 66 in opposite directions when they move towards the roller platen 16. Thus if a recording stylus 44, for correct replies is actuated, the feed pawl 62 will rotate the ratchet clockwise as indicated by the arrow in FIG. 2, whereas if a recording stylus 46 for incorrect replies is actuated, the feed pawl 62 will tend to rotate the ratchet 66 anticlockwise.

Instead of being provided with teeth having a symmetrical tooth profile as shown in the illustration, it is also possible for each ratchet 66 to be provided with two axially adjacent tooth systems having a non-symmetrical, saw-tooth profile, the steep tooth flanks of way, gear tooth system being orientated in the direction of the arrow of FIG. 2 and co-operating only with the feed pawl 64 while the steep tooth flanks of the other system are orientated in the opposite direction and co-operate only with the feed pawl 62.

All the feed pawls 62 of recording styli 44 for correct replies are provided with a common deflector 70, adapted to disengage each feed pawl 62 from its ratchet 66 when its recording stylus 44 is withdrawn from the roller platen 16. In the same say, the feed pawls 64 of all recording styli 46 for incorrect replies are provided with a common deflector 72. Both deflectors 70 and 72 are normally so adjusted that the feed pawls 62, 64 are able to rotate the ratchet 66 by only one tooth each time the associated recording stylus 44 or 46 moves towards the roller platen. HOwever, at least one of the two deflectors 70 and 72 is adjustable so that each movement of the feed pawl of the recording stylus 44 or 46 towards the roller platen 16 can be made to result in rotation of the associated ratchet 66 by two or more tooth pitches. A handle, not shown, and projecting from the housing 10 may be provided for adjusting the deflectors 70, 72.

The system described above, in which the ratchets 66 rotate either clockwise or anticlockwise depending on which of the two associated recording styli 44, 46 has been operated, allows each ratchet to function as a differential counter which indicates the number of correct replies given at the associated pupils' place, minus the number of incorrect replies (if the deflectors 70 and 72 both assume their normal position). An adjustment of one of the two deflectors 70 or 72 means that either each correct or each incorrect reply is given double or multiple weight. Each ratchet 66 is associated with a ratchet spring 74 which retains the gear wheel after each engagement of a feed pawl 62 or 64.

Each ratchet 66 carries a disc 76 having at a point in its circumference a notch 78 into which a detent 80 engages for a defined angular position of the ratchet so as to prevent further anticlockwise rotation of it. Each of the said detents 80, being associated with a pupil's place, forms a contact spring of a limit switch 82 with two pairs of contact $i, j$, both of which are closed for as long as the detent 80, shown in FIG. 2, has not entered the notch 78.

Numerals, the number of which corresponds to the number of teeth of each ratchet 66, are distributed over the circumference of each disc 76. The position of the differential counter formed by each ratchet 66 is thus indicated, in accordance with FIGS. 1 and 2, and it is possible for the end of the ratchet spring 76 engaging into the associated ratchet 66 to be constructed as an indicating marker.

Alongside each ratchet 66 indicating the difference between the numbers of correct and incorrect replies from a pupil's place, is a ratchet 66' indicating the sum of those number, i.e., the total number of questions answered at that pupil's place.

Figure 3:
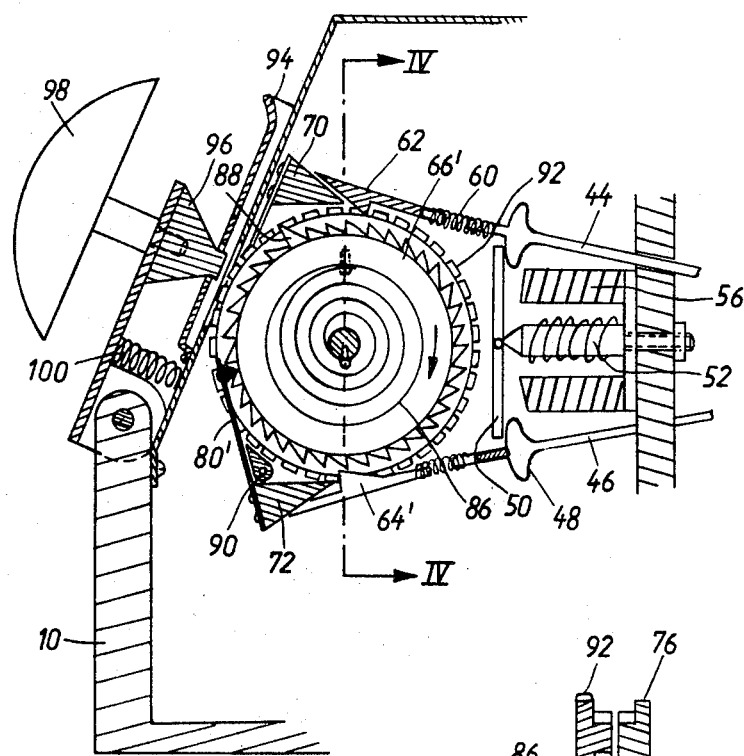
FIG. 3 is a section with modified details in a plane parallel to the sectional plane of FIG. 2.
Figure 4:
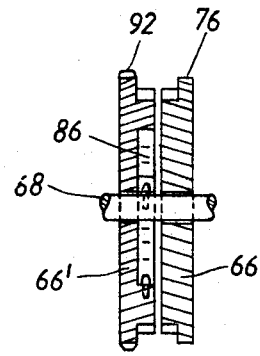
FIG. 4 is a section along the plane IV—IV of FIG. 3.

Thus, as shown in FIGS. 3 and 4, a ratchet 66', having a non-symmetrical tooth profile, is freely rotatably journalled on the shaft 68 adjacent to each ratchet 66. The feed pawl 62 of each recording stylus 44 for correct replies is sufficiently broad to engage the ratchet 66' as well as the ratchet 66 and turns both of them in the same direction, clockwise. A feed pawl 64' co-operating with the feed pawl 64 of the associated ratchet 66 is connected to each recording stylus 46 for incorrect replies, but whereas the feed pawl 64 turns the ratchet 66 anticlockwise as the stylus 46 is advanced for an incorrect reply, the feed pawl 64' turns the ratchet 66' clockwise as the associated recording stylus 46, after being advanced returns to its starting position, illustrated in FIG. 3.

A ratchet spring 80 normally prevents each ratchet 66' from rotating without being acted upon by either of the feed pawls 62 and 64. Each ratchet 66' is connected by a spiral spring 86 to the rigid shaft 68 so that it tends to return to its starting position in which a nose 88, provided on the ratchet, bears on the free end of the ratchet spring 80'. In order to permit the return into their starting position of all ratchets 66' which function as sum counter, a cam shaft 90 is journalled in the housing 10 and is adapted for rotation by means of a handle not shown into a position in which it detaches all ratchet springs 80' from the ratchets 66'.

A rim of raised numerals 92, indicating the appropriate position of the sum counting ratchets is provided on each such ratchet 66'. The housing 10 is provided with a pocket 94 for the introduction of the end of the recording medium 18 which passes over the roller platen 16. A printing strip 96, pivotally supported on the housing 10, protrudes into the pocket and, by applying pressure to a handle 98, is thrust against the resistance of a spring 100 against the numerals 92 of all sum counting ratchets 66' disposed opposite, so that a printed image, indicating the angular position of each individual sum counting wheel, is produced on the recording medium.

The counter-position of all difference ratchets 66 may be recorded as a corresponding printed image if the number wheels 76 are provided with raised numerals. In the illustrated example, however, the counterpositions of the difference ratchets 66 are transmitted at the end of each lesson as lines of greater or lessor length on the recording medium 18. To this end, features of the electrical circuit described below are provided in addition to the previously described constructive features.

Figure 5:
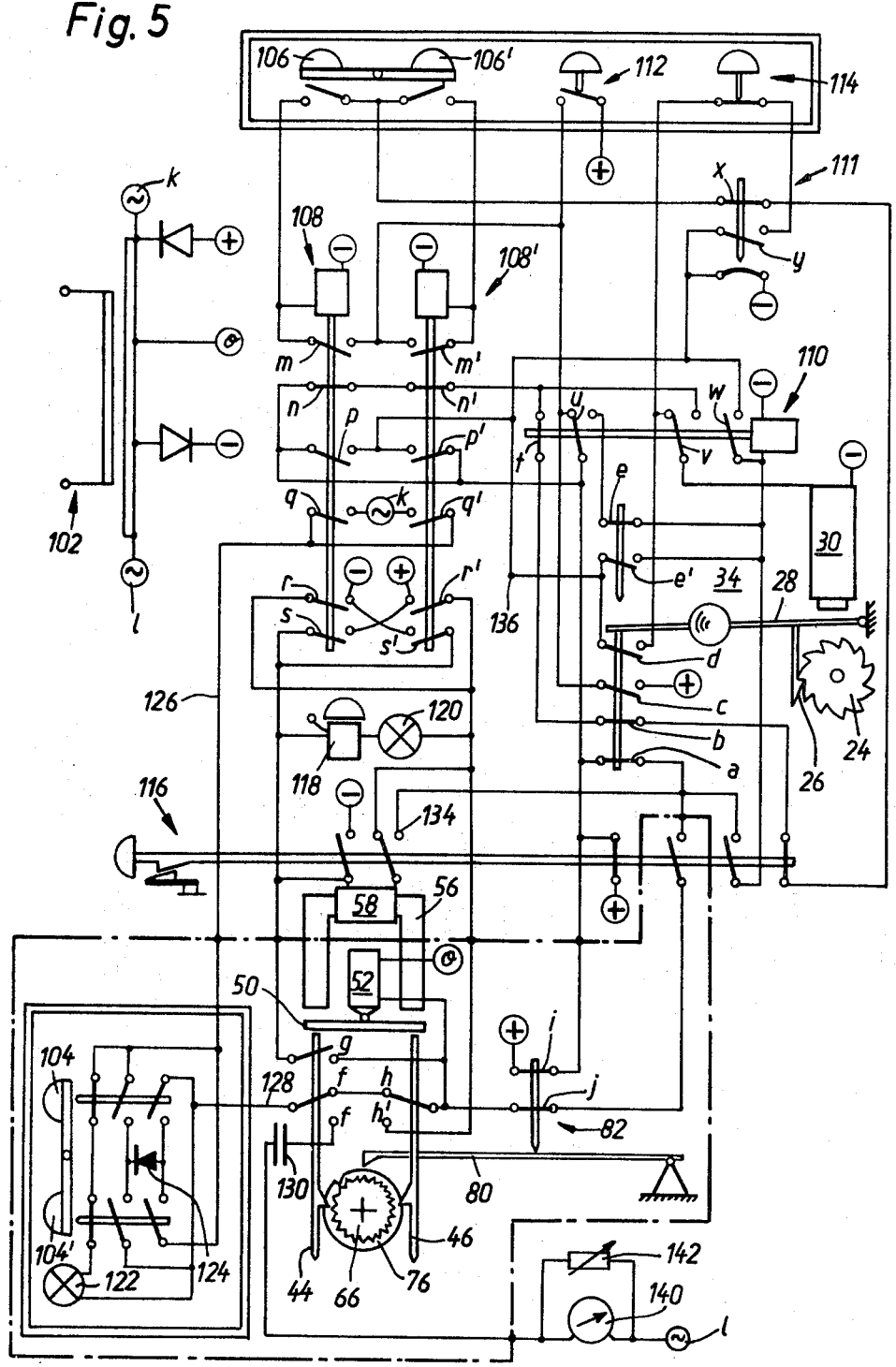
FIG. 5 is a circuit diagram of the recording apparatus illustrated in FIGS. 1 to 4, and one of a number of pupils' places.

The electric circuit comprises a part which is provided only once and all whose elements are disposed in the central recording apparatus. This part of the circuit is illustrated in the upper and middle third of FIG. 5. The lower third of FIG. 5 shows 0 framed in chain lines — a part of the electric circuit associated with an individual pupil place. This part, shown only once for simplicity, is repeated a number of times corresponding to the number of pupil places. It is therefore necessary to visualize that all electrical conductors branch into a number of conductors corresponding to the number of pupils' places at the position at which they intersect with the chin line. The individual elements of the circuit part framed by the chain lines of the circuit are partially component parts of the central recording apparatus in the same way as those, provided only once, in the upper and middle third of FIG. 5. Only the portion framed by the double lines at the bottom left of FIG. 5 is provided directly at each pupil's place.

The part of the circuit provided only once comprises a mains transformer 102 with a terminal $k$ for the lower alternating voltage, a terminal $l$ for a slightly higher alternating voltage and two d.c. terminals, designated with a plus or minus symbol respectively and connected via a rectifier to the secondary winding of the transformer and having a positive or negative potential respectively relative to a neutral position of the secondary winding designated 0. For simplicity those positions of the circuit to which these voltages are applied, are not shown as being connected to the mains transformer 102 but are designated with the corresponding symbols $k$, $l$ +, 0, or — respectively.

In the embodiment illustrated in FIG. 5, each pupil's place comprises two reply button operated switches 104 and 104', mounted on a common rocker, and each connected in the central recording unit so that their optional actuation triggers an optional actuation of the associated recording stylus 44 for correct replies or of the associated recording stylus 46 for incorrect replies. Before the pupils reply to a question, it is possible for the required circuit connections to be made by one of two preselector buttons 106 or 106', provided on a common rocker, to be depressed by the teacher. Each of the preselector buttons 106, 106' is associated with a preselector relay 108 or 108 ; the two preselector relays are identical to each other and each comprise five switches $m-s$ or $m'-s'$. The switch $n$ or $n'$ respectively is closed, the remaining switches of each preselector relay being however open for as long as the associated preselector relay, according to FIG. 5, is dropped out. If one of the preselector relays 108 or 108° is energized owing to the associated preselector button 106 or 106' having been actuated, the associated switch $n$ or $n'$ respectively will open while the remaining switches of the associated preselector relays close.

In addition to the feed relays 34 with the switches $a-e'$ already described with reference to FIG. 2, the central recording apparatus also includes a control relay 110 with switches $t$, $u$, $v$ and $w$ as well as a delay relay 111 constructed as a thermal relay and having switches $x$ and $y$.

The central recording apparatus also includes three switches 112, 114 and 116 which can be manually operated. On being actuated, the switch 112 connects contacts of the switches $m$, $m'$, $u$ and $c$ to the positive terminal of the d.c. source in order to retain, when required, the preselector relay 108 or 108 which may be energized. In its normally closed position, the switch 114 connects a contact of the switch $y$ with one contact each of the switches $v$ and $d$ and in its open position delays the recording process. The switch 116 comprises six switch arms which produce the connections shown in the circuit diagram when the switch is in the normal position as illustrated; when the switch is depressed, it is mechanically interlocked and triggers a process in the course of which the contents of the difference counters 66 are transmitted to the recording medium 18.

An electromagnetically operated gong 118 and a lamp 120, the purpose of both of which is to indicate to the pupils that the recording apparatus is ready to receive replies after one of the preselector buttons 106 and 106' has been actuated, is connected between the contacts of the switches $s$ and $s'$ on the one hand and the contacts of the switches $r$ and $r'$ on the other hand, these being connected to the d.c. source when one of the preselector relays 108 or 108 is energized. The time during which this stand-by state prevails, depends on the setting of the timing relay 111 and can be prolonged at will by operation of the switch 112 so that the teacher is able to give detailed explanations relating to a question even after he has already depressed one of the preselector buttons 106 or 106'.

Figure 5A:
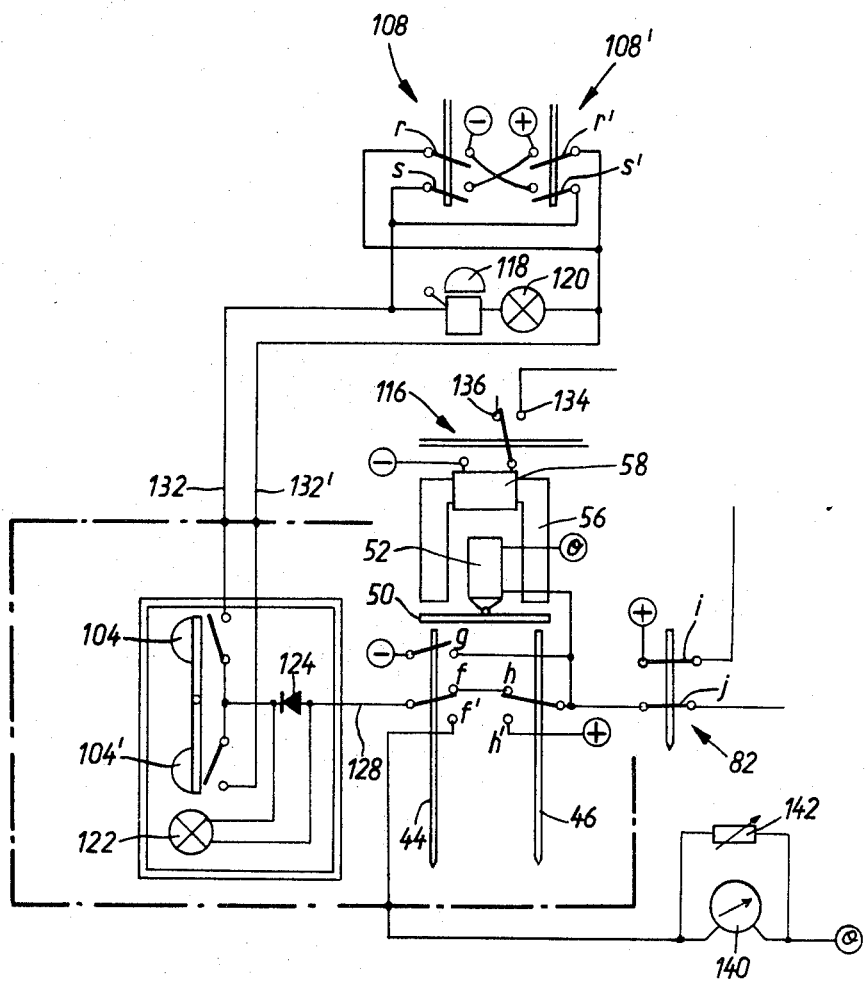
FIG. 5a is a partial circuit diagram of apparatus in which the pupils' places and the parts associated with each individual pupil's place are modified relative to that shown in FIG. 5.

The pupil places, and the directly associated parts of the central recording apparatus, may be differently constructed within the scope of the above description; the different embodiments, illustrated in FIG. 5 and FIG. 5a respectively, differ with regard to the circuit complexity at each individual pupil place and at the associated recording styli, also with regard to the number of conductors required between each pupil place and the central recording apparatus.

In addition to having the reply buttons 104, 104', each pupil place in the two illustrated embodiments incorporates a reply signal lamp 122 to indicate immediately to the pupil whether he has operated the correct or incorrect reply button in a given case. In both embodiments, each pupil place also incorporates a diode 124.

In the embodiment illustrated in FIG. 5, all pupil places are connected to a common a.c. conductor 126 which can be connected to the a.c. terminal $k$ by depressing one of the preselector buttons 106 and 106'. A separate conductor 128, supplying a.c. to the appropriate pupil place after depressing one of the preselector buttons 106 or 106' and prior to depressing one of the reply buttons 104 and 104' is provided as the only return conductor; the a.c. circuit is closed through the two reply buttons, the reply signal lamp 122, the switches $f$ and $h$ at the recording styli 44 and 46 and through the winding of the associated reply magnet 52. The contact $f'$, connected to the conductor 128 when the recording stylus 44 for correct replies is in the recording position, is connected through a capacitor 130 to the a.c. terminal $l$.

In the circuit according to FIG. 5a, the reply buttons 10 of all pupil places are connected through a common conductor 132 to the switches s and s' of the preselector relays 108 and 108 while the reply buttons 104 of all pupil places are connected through a common conductor 132' to the switches r and of the preselector relays. By operating one of the preselector buttons 106 or 106', one of the common conductors 132 and 132' can be connected to the positive terminal, and the other to the negative terminal of the d.c. source. According to FIG. 5a, and in the same way as in the embodiment illustrated in FIG. 5, a single return conductor 128 extends from each pupil position through the normally closed switches f and h of the associated recording styli 44 and 46 and through the winding of the associated reply magnet 52 to the neutral position of the second winding of the transformer 102. The reply signal lamp 122 and the diode 124, connected in parallel to each other, are connected in the return conductor 128 of each pupil place. By depressing one of the reply buttons 104 or 104', the return conductor 128 can be connected to the common conductor 132 or the common conductor 132'. The reply signal lamp 122 will be illuminated only if the current direction in the return conductor 128 is opposite to the forward direction of the rectifier 124. With a given preselection by the depressed preselector button 106 or 106', this direction of current flow is defined by the pupil depressing one of the two reply buttons 104 or 104'.

While in the circuit according to FIG. 5 the direction of current flow in the winding 58 of the field magnet 56 in the illustrated inoperative state of the switch 116 depends on which of the preselector relays 108 or 108 has been energized, the direction of current flown in the winding of the field magnet in the illustrated inoperative state of the switch 116 in the circuit according to FIG. 5a will be the same at all times. The contact f' connected to the return conductor 128 when the recording stylus 44 for correct replies is in the recording position, is connected to the neutral position of the secondary winding of the transformer 102. The contact h' of the recording stylus 46 for incorrect replies is connected to the positive terminal of the d.c. source. The relationship between FIG. 5a and 5 is also indicated by the terminals 134 and 136.

In both embodiments illustrated in FIG. 5 and 5a an ammeter 140, and in parallel with it a control resistor 142, is connected in the common conductor between the contacts f' of all recording styli 44 for correct replies and the a.c. terminal l (FIG. 5) or the neutral position 0 (FIG. 5a) of the secondary transformer winding. The ammeter 140 is provided to indicate the percentage of pupils present who correctly reply to a question by depressing the correct reply button in a given case. Accordingly, the ammeter 140 is provided with a scale division extending from zero to 100% and the control resistor 142 enables the ammeter to be calibrated to 100% in the case of a question to which all pupils present reply correctly, for example a question relating to their presence, when all pupils present at the time shall have actuated the recording stylus associated with each pupil for correct replies.

As indicated in FIG. 1, the measuring instrument 140 is disposed between the roller platen 16 and a marker 44' which is almost identical to the recording styli 44 for the correct replies, but is not associated with a defined pupil place. The plane along which the pointer 144 of the measuring instrument 140 is deflected in accordance with the measured current, is disposed parallel to the axis of the roller platen 16. Approximately in its middle, the pointer 144 is provided with a projection 146 which extends approximately radially towards the roller platen 16 without normally touching it. A spring-biased U-shaped bow 148, the free ends of the members of which are secured on the housing 10, is disposed between the pointer 144 and that end of the marking means 44' which is oriented towards the roller platen 16. By actuating the marker means 44', this arrangement enables the bow 148, and through it the elastically resilient pointer 144, to be thrust upon the roller platen 16 so that the projection 146 produces a printed image on the recording medium 18. A reply magnet 52', constructed in the same way as the reply magnets 52, is provided for actuating the marking means 44' but is so connected as to actuate the latter immediately after the end of the period available to the pupils for replying to a question. Accordingly, the projection 146 produces an additional line profile on the recording medium 18 which indicates the percentage of those pupils present who have correctly replied to each individual question.

The marking means 44', operated once after each question, may co-operate with a sum counting wheel in the same way as the recording styli 44 and 46, to indicate the total number of questions, and may in turn cooperate with a contact which switches off the apparatus after a defined number of questions and triggers a signal.

The method of operation of the apparatus will now be described with reference to the embodiment illustrated in FIG. 5.

In order to prepare the apparatus for replying to a question, the teacher depresses one of the preselector buttons 106 or 106' while the switch 116 of FIG. 5 is in its inoperative state. Depending on which of the preselector buttons is depressed, the associated relay 108 or 108 will be energized. The gong 118 and the lamp will thereupon provide a signal calling upon the pupils to reply to the question. The timing relay 111 begins its operating cycle and the windings 58 of the field magnet will be energized so that the magnet will be energized in a direction depending on which of the preselector buttons was pressed. Each pupil position is provided with a.c. which is also supplied through the associated reply signal lamp 122 to the appropriate reply magnet 52 but cannot cause the associated armature 50 to leave its neutral position. The current flowing in the a.c. circuit of each pupil place is also insufficient to cause the replay signal lamp 122 to be illuminated.

If now, one of the two reply buttons 104 or 104' is depressed at one of the pupil places, the associated reply magnet 52 will be provided with d.c. and thus cause the associated armature 50 to rock to one or the other side. The direction into which each individual armature 50 tends will depend on the one hand on which of the preselector buttons 106 or 106' has been actuated. Depending on whether the relay 108 or 108 has been energized, one end of the windings 58 of the field magnet will be connected via the switch 116 and the switches r or r' to the negative terminal or the positive terminal of the d.c. source. Accordingly, that member of the field magnet 56 which is on the left in FIG. 5 will form a northpole and the other member a south-pole or vice versa. For as long as alternating current flows through the winding of a reply magnet 52 in the circuit according to FIG. 5 (or the winding is dead in the circuit according to FIG. 5a), the associated armature 50 will remain in its neutral position in which the associated styli 44 and 46 both assume their neutral position, withdrawn from the recording medium 18.

Each armature 50 is pivoted only when the winding of the associated reply magnet 52 is so connected, due to actuation of one of the two reply buttons 104 or 104' of the appropriate pupil, that current flows through in only one defined direction, so that one end, on which the armature 50 is supported, forms either a north pole or a south pole. Only then, and depending on which of the preselector buttons 106 or 106' has been actuated, and depending on which of the reply buttons 104 or 104' of the appropriate pupil place has been operated, either the recording stylus 44 for correct replies, or the recording stylus 46 for incorrect replies, will be thrust against the recording medium 18.

As soon as one of the recording styli associated with a defined pupil place has assumed its recording position, the associated reply magnet 52 will be interlocked against repeated depressing of a reply button 104 or 104' at the associated pupil place. In the embodiment illustrated in FIG. 5, one pupil position, at which the correct reply button 104 or 104' has been depressed in the appropriate case, is connected through the return conductor 128, the contact f' and the capacitor 130 to the a.c. terminal n at higher voltage so that the associated reply signal lamp 122 is illuminated.

After the period of time set aside for replying to a question, the timing relay 111 will be energized, and the feed relay 34 will be energized unless the teacher prolongs the period for replying by temporarily maintaining the switch 114 open by depressing the associated button. When the feed relay 34 has been energized and has thus indexed the roller platen by one step, the control relay 110 will also be energized and allow the feed relay to drop out. The feed relay 34 has a certain inertia indicated in FIG. 5 by the associated armature 28 having an inertia mass shown as a sphere; the required inertia may however also be produced by other means, for example by a pneumatic damping member. After the feed relay 34 has dropped out, the preselector relay 108 or 108', operated at the beginning of the working cycle by depressing one of the preselector buttons 106 or 106', will also drop out unless it is retained by operating the switch 112. When the previously energized preselector relays have dropped out, the lamp 120 is extinguished, all rocker armatures 50 and therefore all recording styli 44 and 46 return into their neutral position and the reply signal lamps 112, previously illuminated, will be extinguished.

The feed relay 34 will then once again be energized while none of the recording styli bears upon the recording medium 18 so that a space remains between each line produced as a result of the operating cycle described above, and each line which may be produced during the next operating cycle. While the timing relay 111 cools, the control relay 110 and the feed relay 34 drop out and finally the timing relay itself drops out. The next normal operating cycle during instruction begins in the same manner as that described, in that the teacher depresses one of the preselector buttons 106 or 106' or one of the said preselector switches is operated by a programme; the entire cycle is then repeated.

The teacher will depress the switch 116 if the contents of the difference counters 66 are to be transferred into the documentation as a total result at the end of a lesson. Accordingly, the windings of all reply magnets 52 and the winding 58 of the field magnet 56 are provided with current. The direciton of current flow is such that all recording styli 46 for incorrect replies are pressed against the recording surface 18 if the associated difference counter 66 is not in a position at which the associated detent 80 engages in its notch and thus opens the switches $i$ and $j$. All the difference counters 66 in which this condition is not satisfied, are turned back through one step by the associated recording stylus 46. At the same time, the control relay 110, and therefore the feed relay 34 will be energized; after a period of time, defined by the inertia of the armature 28, the control relay 110 once again drops out and, owing to the resetting force exerted by the contact spring of the associated switches $h$, $h'$, all recording styli 46 return into their inoperative position. The feed relay 34 will thereupon also return into the inoperative position.

For as long as at least one of the difference counters 66 has not assumed its notch position, the operating cycle described last will be repeated, by virtue of the fact that the windings of all reply magnets 52, being associated with a difference counter whose detent 80 has not yet engaged, and by virtue of the fact that the windings 58 of the field magnet 56 are provided with current. The central recording apparatus is automatically stopped as soon as all detents 80 engage with the associated notches 78.

I claim:

1. Apparatus for evaluating pupils' replies to questions, comprising a number of pupils' answering stations and a central recording apparatus for operation from an electrical power supply source, the pupils' stations each comprising a set of reply switches for selectively transmitting an electrical signal from an operated reply switch to the central recording apparatus, the central recording apparatus comprising a recording medium, means for advancing the recording medium in a step by step motion after each question, a number of separate markers for marking correct pupils' replies on the recording medium, the number of markers corresponding to the number of separate pupils' stations, each of the separate markers being associated with a particular one of the pupils' stations and spaced from the corresponding correct reply markers of other pupils' stations in a direction transverse to the direction of motion of the recording medium, and adapted to mark only correct replies in a column on the recording medium, a preselecting circuit comprising a number of preselecting switches corresponding to the number of reply switches at each pupil's station and cooperating therewith to evaluate the signal effected by the operation of a reply switch as a correct or incorrect reply to a question by a pupil at the particular pupil's station, and means for preventing the correct reply markers from being actuated upon actuation of any one of the associated pupils' reply switches unless the correspondng preselecting switch has first been actuated for an associated reply switch thereby assuring only correct replies being marked on the recording medium and wherein the central recording apparatus further comprises at least one additional marker for each pupil's station for selectively marking incorrect replies on the recording medium, each of the markers for incorrect replies being associated with a particular one of the pupils' stations and adapted to mark all incorrect replies in a column on the recording medium which is transversely spaced from the column for correct replies, and means for preventing the incorrect reply markers from being actuated upon actuation of the particular reply switch at each pupils' station which corresponds to the preselecting switch which has been actuated to select the correct reply marker for a particular question thereby assuring only correct replies being marked on the recording medium in the correct reply column and only incorrect replies being marked on the recording medium in the incorrect reply column.

2. Apparatus according to claim 1, wherein the incorrect reply markers are spaced from the associated correct reply markers in a direction longitudinally of the direction of motion of the recording medium corresponding to half a step's travel length of the recording medium in the direction of motion.

3. Apparatus according to claim 1 further comprising a rocking magnet armature associated with each correct reply and incorrect reply markers, each rocking magnet armature having a central position in which both markers are spaced from the recording medium and adapted for rocking motion between two limiting positions to engage either marker with the recording medium, and a reply magnet associated with each marker and controlled by the reply switches at the associated pupils' station for operating an associated marker upon operation of the selected reply switch.

4. Apparatus according to claim 3, wherein each reply magnet includes an armature which is supported on one end of a rod-shaped magnet core having a winding in which the direction of current flow therethrough depends on the operation of the reply switch and determines whether the armature will be of a North pole or a South pole, all the reply magnets cooperating with a common field magnet the poles of which extend parallel to the axes of tilting of the armatures which are in line.

5. Apparatus according to claim 4, wherein the direction of current in the winding of the rod-shaped magnet core can be preselected by a switch which is actuated by the teacher or which is program controlled.

6. Apparatus according to claim 3, further comprising a ratchet type counter associated with each associated pair of correct reply and incorrect reply markers to count the difference between the numbers of correct and incorrect replies, each marker having one feed pawl held retracted from the ratchet when the associated rocking magnet armature is in the central position and arranged for each operation of the associated marker to engage the associated ratchet and to advance it in a forward direction for a correct reply and in a rearward direction for an incorrect reply.

7. Apparatus according to claim 6, wherein all of the one feed pawls operating the counter in the same direction are provided with a common adjustable deflector which is arranged to retract the feed pawls and is selectively adjustable so that the feed pawls optionally advance the counter by a selected number of teeth on the ratchet for each actuation of the feed pawls.

8. Apparatus according to claim 6 further comprising a pulse transmitter device wherein each pulse of which actuates the marking apparatus in the same way as an incorrect reply, the pulse transmitter adapted to be connected to the windings of the rocking magnet armatures and the reply magnets so that all differential counters are reversed in steps while the recording medium is advanced, and a switch associated with each ratchet adapted to operate to disconnect the pulse transmitter from the associated reply magnet to stop the associated counter after it has been returned to its initial starting position.

9. Apparatus according to claim 3, further comprising a common ratchet to count the total number of correct and incorrect replies, each pair of associated markers provided with additional feed pawls to actuate the common ratchet to advance it in a direction to act as a counter for the total number of both correct and incorrect replies.

10. Apparatus according to claim 3, wherein switches are provided on each pair of associated correct reply and incorrect reply markers, the switches being connected in series with each other and with the winding of the associated reply magnet and the associated reply switches when both markers are in the inoperative state, and in the operative state of the associated marker the switch provided thereon electrically connects the winding of the associated reply magnet to a voltage maintaining the operative position of the armature of the reply magnet while simultaneously bypassing the switch provided on the associated second inoperative marker and the reply switches and connecting through a switch which opens only after the recording medium has been advanced by one step thereby assuring only a single marking for each position on the recording medium for each pupils' station.

11. Apparatus according to claim 10, wherein at least two of the reply swtiches of each pupil's station are ach connected through a single direct-current which is common to all corresponding reply switches of all pupils' stations, the conductor connected to a preselector switch adapted to define the current direction therethrough, and, when the reply switches are actuated, to connect the appropriate common conductor through the switches provided on both the associated correct reply and incorrect reply markers to the winding of the associated reply magnet armature.

12. Apparatus according to claim 3, wherein each pupil's station is provided with two reply switches each adapted, in its operative position, to close an alternating current circuit containing the associated reply magnet armature winding through a rectifier, the respective reply switches connecting the rectifier in opposite directions in relation to the reply magnet armature winding to determine the direction of current flow through the winding so as to select whether the armature will be of a North pole or a South pole configuration.

13. Apparatus according to claim 1 further comprising an electrical measuring instrument having a pivotally mounted pointer with a marker member supported thereon, the position of the pointer depending on the total number of correct pupils' replies given to each question, the pointer and associated marking member being positioned adjacent the recording medium for marking thereon, and an additional member adapted for actuation after each question to thrust the marking member against the recording medium transversely to the pivoting plane of the pointer for marking the recording medium.

* * * * *